No. 655,542. Patented Aug. 7, 1900.
J. A. BELTZ.
DRAFT EQUALIZER.
(Application filed Jan. 25, 1900.)
(No Model.)
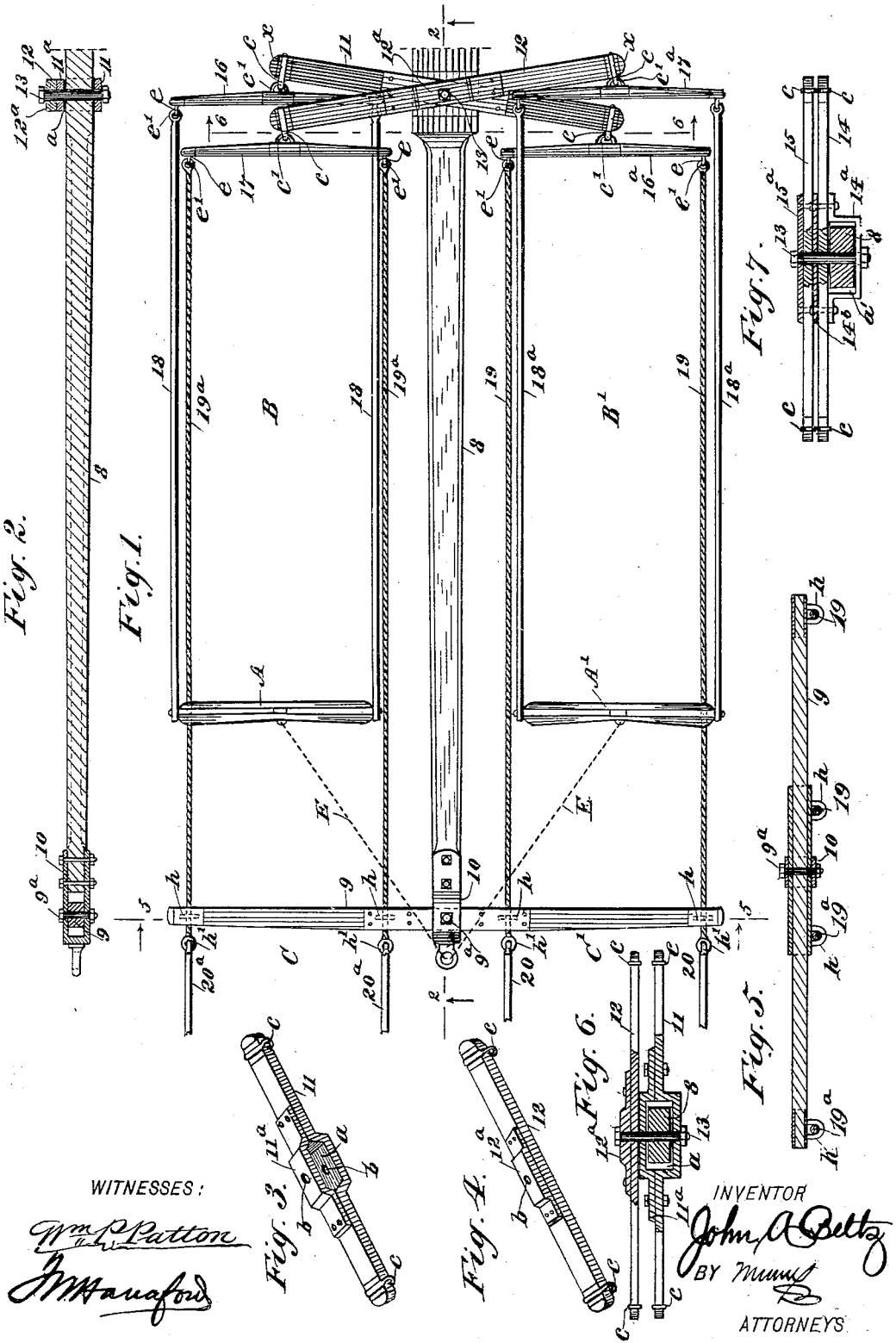
WITNESSES:
INVENTOR
John A. Beltz
BY Munn
ATTORNEYS

UNITED STATES PATENT OFFICE.

JOHN A. BELTZ, OF BUXTON, NORTH DAKOTA.

DRAFT-EQUALIZER.

SPECIFICATION forming part of Letters Patent No. 655,542, dated August 7, 1900.

Application filed January 25, 1900. Serial No. 2,764. (No model.)

*To all whom it may concern:*

Be it known that I, JOHN A. BELTZ, a citizen of the United States, and a resident of Buxton, in the county of Traill and State of North Dakota, have invented a new and Improved Draft-Equalizer, of which the following is a full, clear, and exact description.

The object of this invention is to provide a novel, simple, and highly-efficient equalizing device for evenly distributing the draft force of animals when applied for the progressive movement of heavy or light wagons, agricultural implements, or other portable machines.

The invention consists in the novel construction and combination of parts, as is hereinafter described, and defined in the appended claims.

Reference is to be had to the accompanying drawings, forming a part of this specification, in which similar characters of reference indicate corresponding parts in all the figures.

Figure 1 is a plan view of the improved draft-equalizer arranged for equalizing the draft force of four animals. Fig. 2 is a longitudinal sectional view substantially on the line 2 2 in Fig. 1. Fig. 3 is a perspective view of an improved doubletree which embodies features of the invention. Fig. 4 is a perspective view of another doubletree used in connection with the one shown in Fig. 3. Fig. 5 is a longitudinal sectional view, on the line 5 5 in Fig. 1, of a spreader-bar forming part of the improvement. Fig. 6 is a sectional view on the line 6 6 in Fig. 1, and Fig. 7 is a similar view showing a modified construction of the doubletrees.

In carrying into effect the features of invention, 8 indicates the tongue or pole of a wagon or other conveyance to be moved by draft force, and 9 a transverse spreader-bar held to swing in a horizontal plane on the front end of the pole, as shown in Fig. 1.

The spreader-bar may be loosely secured in position by various means, the means shown consisting of a looped strap or clevis 10, that embraces the top and bottom of the pole 8 and is thereto secured by bolts, the looped portion of said clevis extending forwardly to provide an opening through the clevis for the insertion of the spreader-bar 9, that is pivoted to rock a limited extent by the pivot-bolt $9^a$, which passes down through alined perforations in the clevis and spreader-bar, the perforation in the latter being at the longitudinal center thereof, so that equal portions of the spreader-bar are disposed upon each side of the pole 8, as shown in Fig. 1.

The pole 8 is formed of any suitable material, having a length which will dispose the spreader-bar 9 forwardly of a pair of draft-animals that are harnessed one each side of the pole, as will be hereinafter described. On the rear portion of the pole 8 two doubletrees 11 12 are held at their centers, so as to swing laterally, by the pivot-bolt 13. The doubletrees are of equal length, and preferably the doubletree 11 is formed as shown in Figs. 3 and 6, having an opening $a$ therein, which extends transversely and is of such dimensions as will adapt the pole 8 to be loosely introduced through said opening. In the preferred construction of the doubletree 11 the opening $a$ is produced by recessing the upper side of the body thereof and securing a similarly-recessed cap-plate $11^a$ upon the upper side of the doubletree in such relative position as will dispose the recesses in the cap-plate and body of the doubletree directly opposite each other, which will produce a transverse slot wherein the pole may be loosely introduced, as shown in Figs. 2 and 6. The doubletree 12 is seated upon the cap-plate $11^a$ when the parts of the equalizer device are to be assembled, and it consists, essentially, of a bar of wood or metal having the same width and length as the doubletree 11, a reinforce-plate $12^a$ being preferably supplied for the doubletree 12, and is secured thereon at its center. The doubletrees 11 12 and plates $11^a$ $12^a$ have a central perforation formed vertically therethrough, as indicated at $b$ in Figs. 3 and 4, for the reception of the pivot-bolt 13, that is loosely held in place by a screw-nut or other means.

An equivalent construction of the two doubletrees 11 12 is represented in Fig. 7 and comprises the doubletree-bar 14, whereon a looped bracket-plate $14^a$ is secured to depend from the lower side of said bar, and a similar doubletree-bar 15, having a cap-plate $15^a$ secured on the upper side of the same at its longitudinal center, a wear-plate $14^b$, which is secured upon the top of the doubletree-bar 14, serving to space the doubletrees apart, and thus permit the doubletree 15 to swing freely after it is pivoted upon the lower doubletree by the pivot-bolt 13. The looped bracket-plate $14^a$ provides an opening $a'$ across and below the body of the doubletree 14 for the reception of the rear portion of the pole 8, and a perforation in the latter, which alines with the opposite perforations in the two doubletrees 14 15 and plates $14^a$, $14^b$, and $15^a$, provides a suitable orifice for the insertion of the pivot-bolt 13, which when in place keeps the two doubletrees in rockable engagement with the pole 8 and with each other. On the end portions of the doubletrees 14 15 hooks $c$ or their equivalents are mounted and project from the front edges of the doubletrees, these hooks engaging with eyes $c'$, that are rearwardly projected from the centers of the similar singletrees 16 $16^a$ 17 $17^a$, which are thus loosely shackled in pairs, respectively, upon the ends of the doubletrees 11 12. Suitable connecting-hooks $e$ project forwardly from the ends of each singletree 16 $16^a$ 17 $17^a$, and upon the hooks $e$ on the singletrees 16 and $17^a$, which are shackled upon the opposite outer ends $x$ of the doubletrees 11 12, two pairs of traces 18 and $18^a$ are loosely secured by eyes $e'$ or the like, that are secured upon the rear ends of these traces. As shown in Fig. 1, the traces 18 project forwardly, having sufficient length to be attached upon the opposite sides of a draft-collar A, and the traces $18^a$, which are of an equal length, are connected in a like manner with the draft-collar A'.

It is to be understood that in case ordinary breast bands or straps are employed in place of the collars A A' as portions of the harness then the traces 18 $18^a$ have their front extremities coupled with the rear ends of the breast bands or straps, which construction being common is not shown.

Upon the singletrees $16^a$ and 17 draft connections 19 $19^a$ are loosely secured by their rear ends, preferably by the separable hooks and eyes $e$ $e'$. (See Fig. 1.) The draft connections 19 $19^a$ may be formed of chains, wire rods, or small ropes of metal, leather, or other available material. Each pair of draft connections 19 $19^a$ extends forwardly of a length which will permit them to be passed through loops or ring-eyes $h$, which project from the lower side of the spreader-bar 9, as best shown in Fig. 5.

Two traces 20 have their rear ends removably secured upon the forward ends of the draft connections 19, as indicated at $h'$ in Fig. 1, and a similar pair of traces $20^a$ have their rear ends detachably engaged with the forward extremities of the draft connections $19^a$, as shown at $h'$. The two pairs of forward traces 20 $20^a$ (shown partially in Fig. 1) are to have when completed a similar length to the traces 18 $18^a$ and may in a like manner be connected at their forward ends upon collars, such as A A', or upon breast-bands, as may be preferred.

Two draft-animals (indicated, respectively, by the designating characters B B') may be harnessed in the usual manner at each side of the pole 8 and carry the collars A A', respectively, so that the traces 18 will receive draft strain from the horse B and the traces $18^a$ be pulled upon by the horse B'. A forward pair of horses C C' are in a like manner respectively hitched to the traces $20^a$ and 20, thus providing a four-horse team and adapted for control in the usual way.

It will be seen that the animal B is coupled to the right-hand end of the lower doubletree 11 and the leading animal C' at the left-hand side is hitched to the opposite or left-hand end of said doubletree through the traces 20 and draft connections 19. It will also be apparent that the rear left-hand horse B' is hitched by the traces $18^a$ to the singletree $17^a$, which is shackled upon the left-hand end of the upper doubletree 12, and that the leading horse C on the right-hand side is harnessed to the right-hand end of the upper doubletree 12 by means of the traces $20^a$ and draft connections $19^a$.

From the foregoing it will be manifest that the pull of the four horses is directly upon the doubletrees 11 and 12 and, furthermore, that one leading horse and the diagonally-opposite rear horse are respectively harnessed to opposite ends of the same doubletree, which so disposes the draft strain that each animal must do an equal amount of work, the novel construction and arrangement of the doubletrees 11 12 serving to even the load strain in an obvious manner.

It is claimed that the peculiar construction of the novel draft-equalizer dispenses with singletrees at the front end of the wagon-pole for the leading pair of draft-animals, and as the pull of this team is exerted below the spreader-bar 9 it will be evident that the weight of the pole will be in a great measure removed from the necks of the rear draft-animals, which ordinarily is thrown thereon by the usual connections E, which extend from the end of the pole to the collars A A', as indicated by dotted lines in Fig. 1.

As the loops $h$ $h$ on the neck-yoke or spreader-bar 9 are stationary and the lead horses are hitched to the draft connections 19 $19^a$, which pass through said loops, it will be seen that when the horses are in motion any side sway of the pole 8 will be prevented, which is a very desirable feature, as it obviates the usual threshing of the sides of the rear animals, which ordinarily occurs when the wagon is drawn over a rough road-bed.

There can be no shirking of duty by any animal of the four-horse team hitched to a wagon by the improved draft-equalizer, as the pull of one horse will be thrown upon the neck of the delinquent animal and he must pull to keep going.

The disposal of the entire draft strain at the rear end of the wagon-pole adapts the pull of the animals to have greater effect in moving the loaded wagon than is the case where the forward team pulls from the end of the pole, as is the usual way.

The pull of the leading team is more direct when the improvement is employed, and a fractious horse can be much easier controlled, as his motion must be coöperative with the other animals forming the four-horse team. Owing to the more perfect control of the team afforded by the use of my improved draft-equalizer the need of an expert driver is largely dispensed with and an ordinary driver can readily manage a four-horse team.

In the usual way of hitching the lead horses of a four-horse team to a wagon when a turn to the right or left is required so as to change the direction of the wagon the rear team must do all the work of pulling and turning. This is very objectionable and is fully overcome by the use of the improved draft-equalizer, as the forward pair of draft-animals will control the side movement of the wagon-pole together with the rear pair of animals and must pull equally with them to be comfortable.

Having thus described my invention, I claim as new and desire to secure by Letters Patent—

1. In a draft-equalizer, two doubletrees adapted to swing independently on a wagon-pole.

2. In a draft-equalizer, two doubletrees held to rock one upon the other and also upon a wagon-pole.

3. In a draft-equalizer, a doubletree having a transverse opening near its center for the reception of a wagon-pole.

4. In a draft-equalizer, a pole, a doubletree having a central transverse opening to receive the pole, a draft-equalizer seated upon the said doubletree, and a pivot-bolt passing through both doubletrees and through the pole.

5. In a draft-equalizer, the combination with a pole, a doubletree having an opening therein receiving the pole, another doubletree mounted on the one having the opening, and a pivot-bolt passing through the doubletrees and pole, of pairs of singletrees shackled to the ends of each of the doubletrees.

6. In a draft-equalizer, a doubletree comprising a bar recessed on its upper side, and a recessed cap-plate secured over the recess in the bar, both the bar and cap-plate having a perforation opposite each other.

7. In a draft-equalizer, the combination with a pole, rockable doubletrees pivoted one over the other at the rear end of the pole, singletrees loosely secured on the ends of both of the doubletrees, and draft connections extended forwardly from the ends of the singletrees, of a spreader-bar or neck-yoke held transversely on the forward end of the pole, and loops on said spreader-bar through which the draft connections pass.

8. In a draft-equalizer, the combination with a pole, rockable doubletrees pivoted one over the other at the rear end of the pole, and a singletree shackled on each end of each doubletree, of a pair of traces loosely coupled to one of the singletrees at the outer end of the lower doubletree, a pair of traces coupled to the ends of one of the singletrees held on the opposite end of the upper doubletree, and pairs of draft connections loosely secured respectively upon the ends of each of the two other singletrees that are shackled upon the other ends of the doubletrees.

In testimony whereof I have signed my name to this specification in the presence of two subscribing witnesses.

JOHN A. BELTZ.

Witnesses:
O. S. HANSON,
J. GRASSIED.